(12) United States Patent
McCallum et al.

(10) Patent No.: US 12,214,968 B2
(45) Date of Patent: Feb. 4, 2025

(54) SYSTEMS AND METHODS FOR CONTROLLING CONVEYORS DURING CASTING

(71) Applicant: Novelis Inc., Atlanta, GA (US)

(72) Inventors: John Robert Buster McCallum, Spokane, WA (US); John S. Tingey, Rathdrum, ID (US); William M. Betts, Liberty Lake, WA (US)

(73) Assignee: NOVELIS INC., Atlanta, GA (US)

( * ) Notice: Subject to any disclaimer, the term of this patent is extended or adjusted under 35 U.S.C. 154(b) by 99 days.

(21) Appl. No.: 17/996,645

(22) PCT Filed: May 13, 2021

(86) PCT No.: PCT/US2021/032156
§ 371 (c)(1),
(2) Date: Oct. 20, 2022

(87) PCT Pub. No.: WO2021/231682
PCT Pub. Date: Nov. 18, 2021

(65) Prior Publication Data
US 2023/0202767 A1    Jun. 29, 2023

Related U.S. Application Data

(60) Provisional application No. 63/024,664, filed on May 14, 2020.

(51) Int. Cl.
*B22D 11/126* (2006.01)
*B22D 11/16* (2006.01)
*B65G 43/10* (2006.01)

(52) U.S. Cl.
CPC ............ *B65G 43/10* (2013.01); *B22D 11/126* (2013.01); *B22D 11/163* (2013.01); *B65G 2203/0208* (2013.01); *B65G 2203/044* (2013.01)

(58) Field of Classification Search
CPC ....... B22D 11/12; B22D 11/126; B22D 11/16; B22D 11/163; B65G 43/10
(Continued)

(56) References Cited

U.S. PATENT DOCUMENTS 7,028,750 B2    4/2006  Bowles et al.
2008/0082206 A1  4/2008  Egami et al.
(Continued)

FOREIGN PATENT DOCUMENTS

CN    110560651 A    12/2019
JP     56126059 A    10/1981
(Continued)

OTHER PUBLICATIONS

PCT/US2021/032156, "International Search Report and Written Opinion", Sep. 10, 2021, 12 pages.
(Continued)

*Primary Examiner* — Kevin P Kerns
(74) *Attorney, Agent, or Firm* — Kilpatrick Townsend & Stockton LLP (57) ABSTRACT

A metal casting system includes a master conveyor, a slave conveyor, a cutting device, and a control system. The master conveyor includes a first belt and a first motor, and the slave conveyor is separated from the master conveyor and includes a second belt and a second motor. The cutting device is between the master conveyor and the slave conveyor and selectively cuts a metal product that is conveyed by the master conveyor and the slave conveyor. The control system includes a sensor that detects ends of sections of the metal product as the sections of the metal product move in a downstream direction. The control system also includes a controller communicatively coupled with the sensor. The
(Continued)

controller selectively controls at least one of the first motor or the second motor based on the detected ends from the sensor.

15 Claims, 4 Drawing Sheets

(58) Field of Classification Search
USPC ....... 164/263, 413, 454, 70.1, 460; 29/527.6
See application file for complete search history.

(56) References Cited

U.S. PATENT DOCUMENTS

| | | |
|---|---|---|
| 2009/0032370 A1 | 2/2009 | Konig et al. |
| 2009/0165986 A1* | 7/2009 | Seidel et al. ....... B22D 11/1206 164/151.4 |
| 2020/0109011 A1 | 4/2020 | Fourney |

FOREIGN PATENT DOCUMENTS

| | | |
|---|---|---|
| JP | 01254362 A | 10/1989 |
| JP | 2007513771 A | 5/2007 |

OTHER PUBLICATIONS

PCT/US2021/032156, "International Preliminary Report on Patentability", Nov. 24, 2022, 8 pages.
CA3,175,111, "Notice of Allowance", Apr. 23, 2024, 1 page.
CA3,175,111, "Office Action", Oct. 27, 2023, 4 pages.
EP21729747.2, "Office Action", Oct. 4, 2023, 7 pages.
JP2022-565862, "Notice of Decision to Grant", Mar. 12, 2024, 3 pages.
JP2022-565862, "Office Action", Oct. 17, 2023, 6 pages.
KR10-2022-7033124, "Office Action", Nov. 10, 2023, 7 pages.

* cited by examiner

SYSTEMS AND METHODS FOR CONTROLLING CONVEYORS DURING CASTING

REFERENCE TO RELATED APPLICATION

This application is a national stage entry of International Patent Application No. PCT/US2021/032156, filed on May 13, 2021, and entitled SYSTEMS AND METHODS FOR CONTROLLING CONVEYORS DURING CASTING, which claims the benefit of U.S. Provisional Application No. 63/024,664, filed on May 14, 2020 and entitled SYSTEMS AND METHODS FOR CONTROLLING CONVEYORS DURING CASTING, the content of both which is hereby incorporated by reference in their entireties.

FIELD OF THE INVENTION

This application relates to casting systems for casting of metal products including, but not limited to, aluminum and aluminum alloys, and in particular to casting systems with conveyors.

BACKGROUND

Metal produced may be produced by both vertical casting procedures as well as horizontal casting procedures. During a typical horizontal casting procedure, a first belt (or other conveying means) draws the metal product out of a mold, and continues to draw the metal product until the metal product reaches a second belt (or other conveying means) that is downstream from the first belt. The second belt also begins to pull on the metal product. A saw is positioned between the first belt and the second belt that cuts the metal product so that it is no longer continuous. After the metal product is cut, a gap is formed between the metal product at least partially on the first belt and the metal product at least partially on the second belt.

A common problem with the setup for the typical horizontal casting procedure is that due to variance in the belts, the speed of the belts (and thus the speed of the metal product) does not necessarily match the speed of the two motors that drive the first belt and the second belt, respectively. As such, even though the two motors may be in sync, the two belts may be out of sync, which can have undesirable effects on the casting process. For example, if the second belt is moving slower than the first belt, the metal product moving off of the first belt may run into the metal product on the second belt, thereby reducing or closing the gap, which may affect the casting process in the mold. For example, during the process, a saw carriage supporting a saw moves in sync with the first belt. If the second belt is moving slower than the first belt, that means the metal product on the second belt after the cut is moving slower than the saw carriage is, and when this happens, the metal product can contact the saw blade while the blade is spinning, and when the feed retracts, the saw has a back cut. If this speed difference is too much, there may be a lot of undesirable force from the metal product on the saw blade. An additional negative with the second belt running slower is the metal product will end up being the incorrect length as the metal product on the second belt will have some impact on the actual casting speed, which is also true if the first belt is moving slower than the second belt. In some cases, if the second belt is moving faster than the first belt, the gap between the cut metal products may increase in size, thereby increasing the possibility that a roller clamp falls into the gap, which the metal product on the first belt can then run into and stop the casting process. As such, both conditions may cause defects in the cast product.

SUMMARY

Embodiments covered by this patent are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain embodiments, a metal casting system includes a master conveyor having a first conveying device and a first motor configured to drive the first conveying device. The metal casting system also includes a slave conveyor have a second conveying device and a second motor configured to drive the second conveying device. A cutting device may be provided between the master conveyor and the slave conveyor that is configured to selectively cut a metal product that is conveyed by the master conveyor and the slave conveyor. The metal casting system includes a control system having a sensor and a controller. The sensor is downstream from the cutting device and is configured to detect ends of sections of the metal product as the sections of the metal product move in a downstream direction. The controller is communicatively coupled with the sensor, and the controller is configured to control at least one of the first motor or the second motor based on the detected ends from the sensor.

According to some embodiments, a conveyor system for a metal casting system includes a master conveyor, a slave conveyor, and a control system. The master conveyor includes a first motor configured to drive a first endless belt, and the slave conveyor includes a second motor configured to drive a second endless belt. The control system includes a sensor and a controller. The sensor is configured to detect ends of sections of a metal product being conveyed by at least one of the first endless belt or the second endless belt as the sections of the metal product move in a downstream direction. The controller is communicatively coupled with the sensor, and the controller is configured to control at least one of the first motor or the second motor based on the detected ends from the sensor.

According to certain embodiments, a method of controlling a conveying system having a master conveyor and a slave conveyor includes detecting, with a sensor, sequential ends of a metal product being conveyed in a downstream direction by the conveying system. The method includes determining, by a controller, an actual length between the sequential ends based on the detected sequential ends; comparing, by the controller, the actual length to a predetermined length; and determining, by the controller, a control speed of a motor of at least one of the master conveyor or the slave conveyor such that the actual length is within a predetermined tolerance of the predetermined length. The method includes controlling, by the controller, the motor to operate at the control speed and such that the actual length is within a predetermined tolerance of the predetermined length.

According to some embodiments, a method of controlling a conveying system having a master conveyor and a slave conveyor includes detecting, with a sensor, a gap start end and a gap stop end of a gap between a first section of a metal product at least partially on the master conveyor and a second section of the metal product at least partially on the slave conveyor, where the second section is spaced apart from the first section by the gap. The method includes determining, by a controller, an actual gap length based on the gap start end and the gap stop end detected by the sensor; comparing, by the controller, the actual gap length to a predetermined gap length; and determining, by the controller, a speed of a motor of the slave conveyor such that the actual gap length is within a predetermined tolerance of the predetermined gap length. The method includes controlling, by the controller, the motor to the determined speed such that the actual gap length is within a predetermined tolerance of the predetermined gap length.

According to various embodiments, a method of controlling a conveying system having a master conveyor and a slave conveyor includes detecting, with a sensor, a product start end and a product stop end of a cut section of a metal product while the cut section is conveyed by the conveying system. The method includes determining, by a controller, an actual product length based on the product start end and the product stop end detected by the sensor; comparing, by the controller, the actual product length to a predetermined product length; and determining, by the controller, a speed of a motor of the master conveyor such that the actual product length is within a predetermined tolerance of the predetermined product length. The method includes controlling, by the controller, the motor to the determined speed such that the actual product length is within a predetermined tolerance of the predetermined product length.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DETAILED DESCRIPTION

The subject matter of embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing.

Described herein is a control system for controlling conveyors of a conveyor system and associated methods of controlling the conveyors with the control system. Metal casting systems that may incorporate the control system and the conveyor system with belts are also described herein. Such metal casting systems may include, but are not limited to, continuous casting systems. In one non-limiting example, the metal casting system incorporating the control system and the conveyor system is a horizontal continuous casting system. Such metal casting systems may be utilized to produce various metal products, including, but not limited to, metal products that are aluminum or aluminum alloys. Conveyors of the conveyor system may be various suitable conveying devices or mechanisms for conveying a metal product, and may include, but are not limited to, belts, rollers, and/or other suitable devices or mechanisms as desired.

The control system may include a sensor and a controller that is communicatively coupled to the sensor as well as a first motor that drives a master conveyor and/or a second motor that drives a slave conveyor. The sensor may detect ends of sections of the metal product as the sections of the metal product move in a downstream direction, and the controller may selectively control the first motor of the master conveyor and/or the second motor of the slave conveyor based on the detected ends from the sensor. As one non-limiting example, a method of controlling the conveying system may include detecting, with the sensor, sequential ends of the metal product being conveyed in a downstream direction by the conveying system. The method may include determining, by the controller, an actual length between the sequential ends based on the detected sequential ends, comparing, by the controller, the actual length to a predetermined length, and determining, by the controller, a control speed of a the first motor such that the actual length is within a predetermined tolerance of the predetermined length. In certain embodiments, being within the predetermined tolerance may include matching the actual length with the predetermined length. The method may further include controlling, by the controller, the motor to operate at the control speed and such that the actual length is within a predetermined tolerance of the predetermined length.

The control system described herein may improve the synchronization of the master belt and the slave belt of the conveyor system to maintain and/or minimize variations in length of gaps between a cut section of the metal product and a section of the metal product upstream from the cut section. The control system described herein may also improve the synchronization of the master belt and the slave belt of the conveyor system to maintain and/or minimize variations in length of the cut sections of the metal product. By synchronizing the master belt and the slave belt, the control system may also minimize potential damage to the metal product and/or the components of the casting system that may otherwise occur due to variations between the first belt and the second belt. In certain aspects, the control system allows for adjustment and control of the conveyor system during a casting process.

Figure 1:
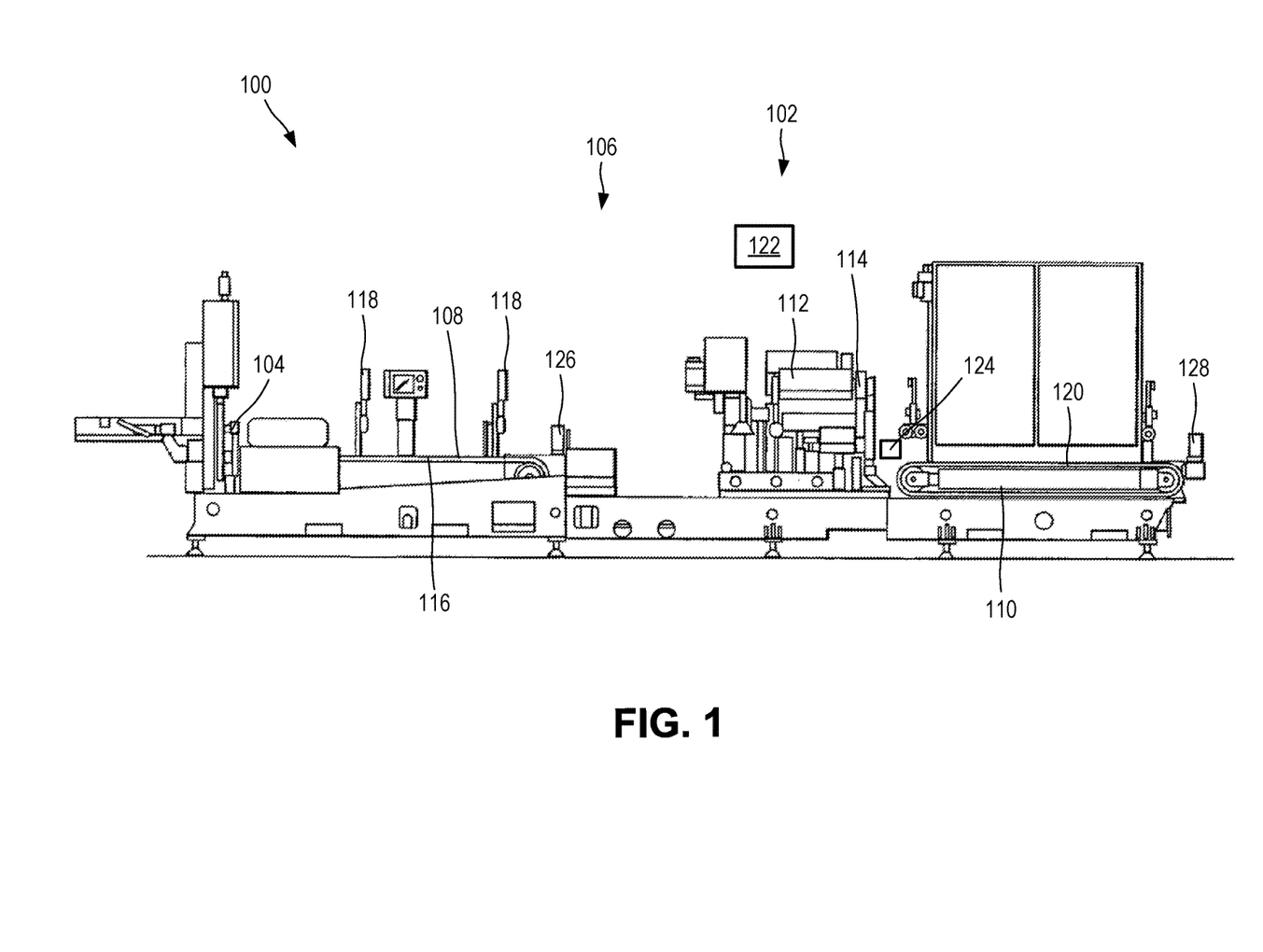
FIG. 1 illustrates a horizontal casting system with a control system according to embodiments of the disclosure.

FIG. 1 illustrates an example of a metal casting system 100 with a control system 102 according to various embodiments. In some cases, the metal casting system 100 is a continuous casting system that includes a casting mold 104, a conveyor system 106 with a first conveyor 108 and a second conveyor 110, and a cutting device 112. The particular metal casting system 100 illustrated in FIG. 1 and described below is provided for reference purposes only, and the particular components and/or arrangement of components should not be considered limiting on the current disclosure.

In some examples, the first conveyor 108 may be positioned downstream from the casting mold 104 and adjacent to an outlet of the casting mold 104. The first conveyor 108 includes a first belt 116 and a first motor 126 that drives the first belt 116. In certain cases, the first belt 116 is an endless belt. The first belt 116 may be constructed from various suitable materials including but not limited to rubber. As discussed in greater detail below, during a continuous casting process, a continuous metal product (not shown in FIG. 1) may exit the casting mold 104 and be supported on the first belt 116. Clamps 118 or other suitable devices may optionally be included to hold the metal product against the first belt 116.

The cutting device 112 is downstream from the first conveyor 108 and may include a saw 114 or other suitable cutting device. The saw 114 of the cutting device 112 may selectively contact and cut through the metal product during a cutting operation to form cut sections of the metal product.

The second conveyor 110 is downstream from the first conveyor 108 and downstream from the cutting device 112. Similar to the first conveyor 108, the second conveyor 110 includes a second belt 120 and a second motor 128 that drives the second belt 120. In certain examples, the second belt 120 may be an endless belt and may be constructed from various suitable materials including but not limited to rubber. As discussed in greater detail below, in various aspects, the second belt 120 may support the cut sections of the metal product after the cutting operation and may also at least partially support the metal product prior to the cutting operation.

While the first conveyor 108 and the second conveyor 110 are illustrated with belts, in other examples, the first conveyor 108 and/or the second conveyor 110 may have various other suitable devices or mechanisms for conveying the metal product. As one non-limiting example, the first conveyor 108 and/or the second conveyor 110 may include one or more rollers.

The control system 102 includes a controller 122 and at least one sensor 124. While a single sensor 124 is illustrated, any number of sensors 124 may be utilized as desired. In some examples, the sensor 124 is downstream from the cutting device 112. The particular positioning of the sensor 124 relative to the second conveyor 110 should not be considered limiting, as the sensor 124 may be provided at various locations relative to the second conveyor 110 as desired.

The sensor 124 may detect ends of sections of the metal product as the metal product travels in the downstream direction by the sensor 124. In other examples, the sensor 124 may detect other features or characteristics on the metal product, including, but not limited to marks or other indicators on the metal product. As such, while the following description makes reference to the sensor 124 detecting "ends" of the metal product, it will be appreciated that the sensor 124 could additionally or alternatively detect marks, indicators, etc. on the metal product for controlling the process discussed below.

The sensor 124 may be various suitable devices for detecting the ends of the sections of the metal product, and may include contact sensors or non-contact sensors. In some cases, the sensor 124 is the non-contact sensor, meaning that the sensor 124 detects the ends without physically contacting the metal product. In some non-limiting examples, the sensor 124 may be a laser sensor or an optical sensor. The ends of the sections of the metal product detectable by the sensor 124 may include, but are not limited to, a downstream end of a cut section of the metal product that is discontinuous with an uncut section and/or upstream section of the metal product immediately upstream from the cut section, an upstream end of the cut section, and/or a downstream end of the uncut section and/or upstream section that is proximate to the upstream end of the cut section. As used herein, the "upstream" end refers to the end of the section of the metal product that is closest to the casting mold 104 as the section of the metal product moves away from the casting mold 104, and the "downstream" end is opposite from the upstream end and is the end of the section of the metal product that is farthest from the casting mold 104 as the section of the metal product moves away from the casting mold 104. In various aspects, the sensor 124 may detect the ends of the sections of the metal product by detecting a presence or an absence of the metal product from a sensing region of the sensor 124. In certain cases, the sensor 124 is configured to detect a particular sequence or pair of ends of the sections of the metal product such that the controller 122 can control a particular motor of the conveyor system 106, which is discussed in greater detail below.

The controller 122 is communicatively coupled with the sensor 124 and the first belt drive and/or the second belt drive. As discussed in greater detail below, the controller 122 may selectively control the first motor 126 and/or the second motor 128 based on the ends detected by the sensor 124.

The controller 122 can include one or more of a general purpose processing unit, a processor specially designed for conveyor control analysis and/or metal casting applications, a processor specially designed for wireless communications (such as a Programmable System On Chip™ from Cypress Semiconductor) or other suitable processors. A memory may be provided with the controller 122, although it need not in other examples. When included, the memory may include a long-term storage memory and/or a short-term working memory, and the memory may be used by the controller 122 to store a working set of processor instructions (i.e., the processor may write data to the memory). In some aspects, the memory could include a disk based storage device and/or one of several other type of storage mediums including but not limited to a memory disk, USB drive, flash drive, remotely connected storage medium, virtual disk drive, or the like. Various other features including, but not limited to, a communication circuit/unit, an optional display, an optional speaker, and/or power storage unit may also be included in the controller 122. In some aspects, some or all of the components of the controller 122 may be included together in a single package or sensor suite, such as within the same enclosure. In additional or alternative aspects, some of the components may be included together in an enclosure and the other components may be separate (i.e., the controller 122 may be a distributed system). Other configurations of the controller 122 may be utilized as desired.

In various aspects, the controller 122 communicates data with the sensor 124 such that the controller 122 receives a data signal from the sensor 124. In various aspects, the data signal from the sensor 124 includes the ends of the sections of the metal product detected by the sensor 124. For example, in various cases, the data signal from the sensor 124 includes an indication of a detection of the downstream end of the cut section, the upstream end of the cut section, and/or the downstream end of the uncut and/or upstream section. The controller 122 may analyze the data from the sensor 124 and control the first motor 126 of the first conveyor 108 and/or control the second motor 128 of the second conveyor 110 depending on the detected ends.

During the conveying process, one of the conveyors (e.g., the first conveyor 108) is a "master" conveyor and the other conveyor (e.g., the second conveyor 110) is a "slave" conveyor. It will be appreciated that either conveyor could be the master conveyor or the slave conveyor. The controller 122 controls the motors such that the slave conveyor is synchronized with the master conveyor.

As one non-limiting example, the control system 102 may be utilized to synchronize the slave conveyor with the master conveyor and control a gap between adjacent sections of the metal product. In such examples, the controller 122 may receive from the sensor 124 an indication that the upstream end of the cut section is detected followed by an indication that the downstream end of the uncut and/or upstream section is detected. Based on this sensor data, the controller 122 may determine an actual length of a gap between the cut section and the uncut and/or upstream section of the metal product. As one non-limiting example, the controller 122 may determine the actual length of the gap based on a duration of time between the detection of the upstream end of the cut section and the detection of the downstream end of the uncut and/or upstream section. The controller 122 may compare the actual length of the gap to a desired length of the gap. In some cases the desired length may be predetermined, such as a desired length of the gap for optimal spacing between sections of the cut metal product during subsequent processing. In other examples, the desired length may be a length of a gap previously measured by the control system 102 (i.e., the system may determine if the length of the gap is inconsistent across pieces and adjust according to the inconsistencies). Based on the comparison between the actual length of the gap and the desired length of the gap, the controller 122 may determine a control speed of the motor of the slave conveyor such that is synchronized with the speed of the master conveyor and such that the actual length is within a predetermined tolerance of (and/or is substantially the same as) the desired length. The controller 122 may control the motor of the slave conveyor to operate at the control speed and such that the actual length of the gap is within a predetermined tolerance of the desired length of the gap.

As another non-limiting example, the control system 102 may be utilized to synchronize the master conveyor and the slave conveyor and control a length of a cut section of the metal product. In some cases, the controller 122 may synchronize the master conveyor and the slave conveyor by detecting the gap and controlling the motor of the slave conveyor such that the speed of the slave conveyor is within a predetermined tolerance of (and/or substantially the same as) the speed of the master conveyor and the gap has a desired length, as previously discussed. In various examples, to control the length of the cut section, the controller 122 may receive from the sensor 124 an indication that the downstream end of the cut section is detected followed by an indication that the upstream end of the cut section is detected. Based on this sensor data, the controller 122 may determine an actual length of the cut section of the metal product. As one non-limiting example, the controller 122 may determine the actual length of the cut section based on a duration of time between the detection of the downstream end of the cut section and the detection of the upstream end of the cut section. As another non-limiting example, the controller 122 may determine the actual length of the cut section based on a distance that an indicator travels. The controller 122 may compare the actual length of the cut section to a desired length of the cut section. In some cases, the desired length may be predetermined, such as a desired length of a cut section of the metal product as requested by a customer. Based on the comparison between the actual length of the cut section and the desired length of the cut section, the controller 122 may determine a control speed of the master conveyor such that the actual length is within a predetermined tolerance of (or is substantially the same as) the desired length. The controller 122 may control the motor of the master conveyor to operate at the control speed and such that the actual length of the cut section is within a predetermined tolerance of the desired length of the cut section. In various aspects, because the slave conveyor is synchronized with the master controller, controlling the master conveyor to operate at the control speed also controls the slave conveyor to operate at the control speed.

By controlling the master conveyor and the slave conveyor as described, the control system 102 may control how quickly the cut section is moved away from the upstream section (and thus the length/size of the gap and/or the length of the section).

The aforementioned processes may be repeated as desired during a casting process (e.g., before or after each new cut section of the metal product is formed with the cutting device). Moreover, during a casting process, the control system 102 may only be utilized to control the length of the cut section, the control system 102 may only be utilized to control the length of the gap during the casting process, or the control system 102 may be utilized to control both the length of the cut section and the length of the gap.

Figure 2:
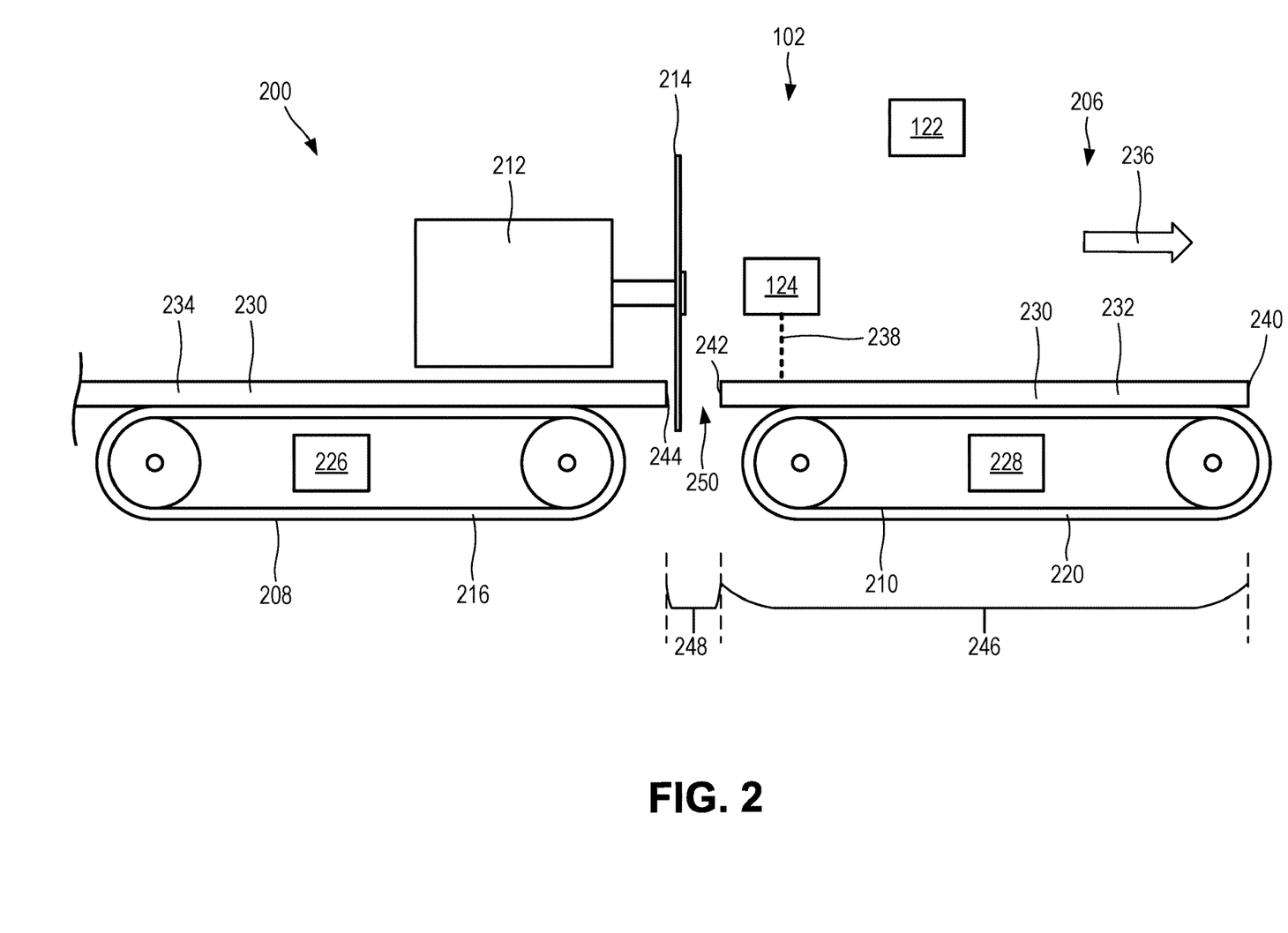
FIG. 2 illustrates a portion of a horizontal casting system with a control system according to embodiments of the disclosure.

FIG. 2 illustrates a portion of a casting system 200 that is substantially similar to the casting system 100 and that also includes the control system 102. Similar to the casting system 100, the casting system 200 includes a conveyor system 206 having a first conveyor 208 and a second conveyor 210. The first conveyor 208 includes a first belt 216 and a first motor 226, and the second conveyor 210 includes a second belt 220 and a second motor 228. Similar to the casting system 100, one of the conveyors (e.g., the first conveyor 208) may be a master conveyor and the other conveyor (e.g., the second conveyor 210) may be the slave conveyor. In other examples, the first conveyor 208 and/or the second conveyor 210 may include mechanisms or devices for conveying the metal product other than belts, including, but not limited to, one or more rollers.

Similar to the casting system 100, the casting system includes a cutting device 212 with a saw 214 between the first conveyor 208 and the second conveyor 210. As illustrated in FIG. 2, a metal product 230 may be supported on the first belt 216 and moved in a downstream direction (represented by arrow 236) towards the second conveyor 210. During a casting operation, the saw 214 of the cutting device 212 may selectively cut the metal product 230 such that a cut section 232 of the metal product 230 is separate from an upstream section 234 (which may be uncut and/or still continuous) of the metal product 230. As illustrated in FIG. 2, the cut section 232 includes a downstream end 240 and an upstream end 242, and the upstream section 234 includes a downstream end 244.

As illustrated in FIG. 2, the sensor 124 of the control system 102 is downstream from the cutting device 212 and has a sensing region (represented by dashed line 238) that detects one or more of the types of ends 240, 242, 244 during a casting process. As mentioned, in examples where the control system 102 may be utilized to control a length 246 of the cut section 232 and/or a length 248 of a gap 250, the controller 122 may control the motor of the master conveyor (e.g., the first motor 226 when the first conveyor 208 is the master conveyor) and/or the motor of the slave conveyor (e.g., the second motor 228 when the second conveyor 210 is the slave conveyor) based on the detection by the sensor 124 of the downstream end 240, the upstream end 242, and/or the downstream end 244.

Figure 3:
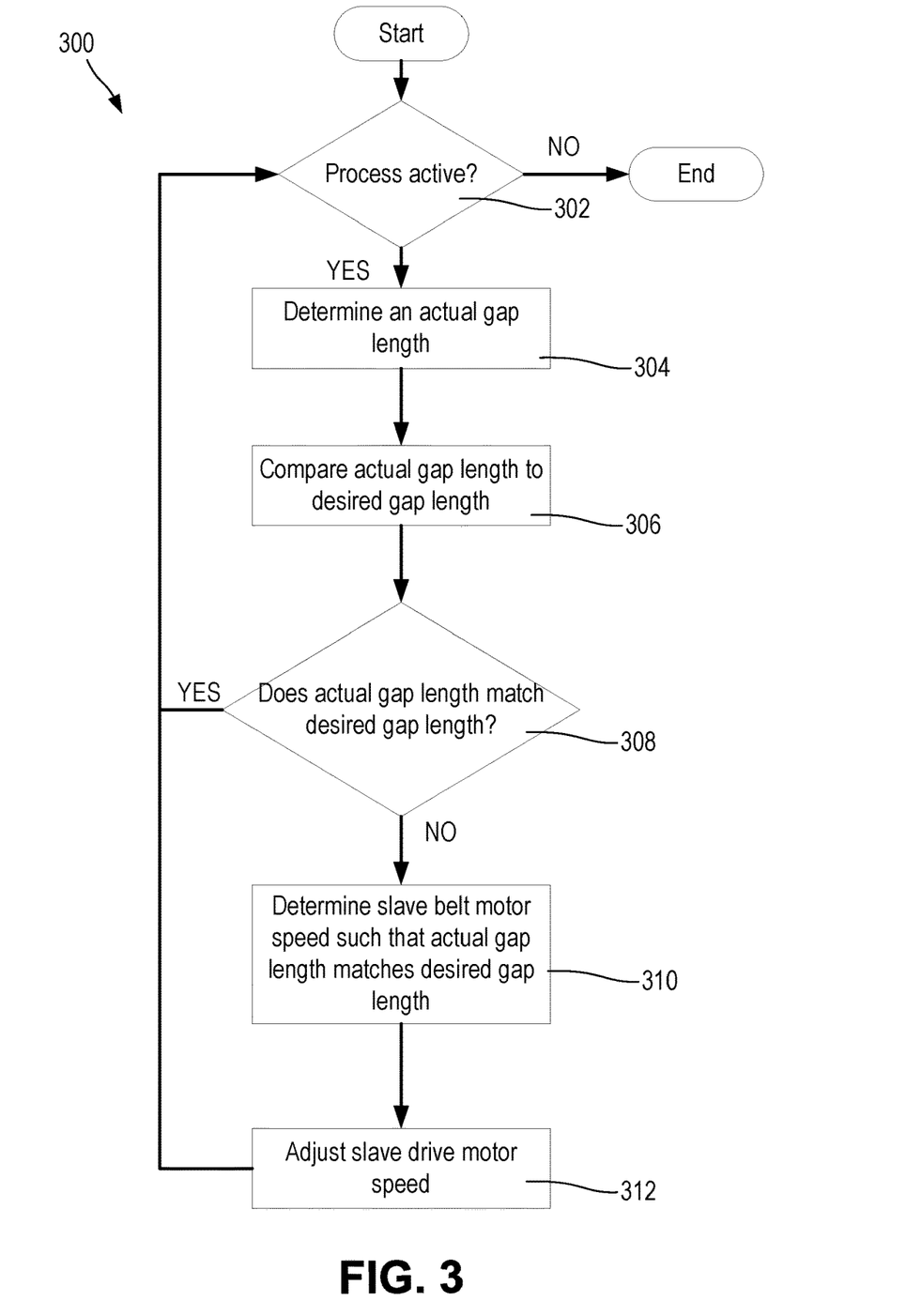
FIG. 3 is a flow chart of a method of controlling conveyors of a horizontal casting system with a belt control system according to embodiments of the disclosure.

FIG. 3 illustrates a non-limiting example of a process 300 of controlling a conveyor system, such as the conveyor system 106 or the conveyor system 206, with the control system 102 to provide a desired gap between adjacent sections of the metal product.

In a block 302, the controller determines whether the conveyor system is being utilized during a casting process and/or otherwise as desired. In various aspects, the process ends when the conveyor system is no longer being utilized.

In a block 304, the controller determines an actual length (or size) of the gap between adjacent sections of the metal product. In some cases, prior to block 304, the method may include detecting, by the sensor, the upstream end of the cut section and the downstream end of the uncut section. In various aspects, block 304 may include receiving, by the controller, the indication that the upstream end of the cut section is detected followed by an indication that the downstream end of the uncut and/or upstream section is detected. Block 304 may also include determining the actual length of the gap between the cut section and the uncut and/or upstream section of the metal product based on the data from the sensor. In some examples, block 304 may include determining the actual length of the gap based on a duration of time between the detection of the upstream end of the cut section and the detection of the downstream end of the uncut and/or upstream section.

In a block 306, the controller compares the actual length of the gap to a desired length of the gap and in a block 308, the controller determines whether the actual length of the gap is within a predetermined tolerance of or is substantially the same as the desired length of the gap. If the actual length is substantially the same as the desired length, the process may return to block 302.

In a block 310, if the actual length of the gap is not substantially the same as the desired length of the gap based on block 308, the controller may determine a control speed for the slave motor of the slave conveyor such that the actual length of the gap is within a predetermined tolerance of the desired length of the gap.

In a block 312, the controller controls the slave motor of the slave conveyor to operate at the control speed and such that the actual length of the gap is within a predetermined tolerance of the desired length of the gap. In various aspects, controlling the slave motor to operate at the control speed synchronizes the slave conveyor with the master conveyor. From block 312, the process returns to block 302.

Figure 4:
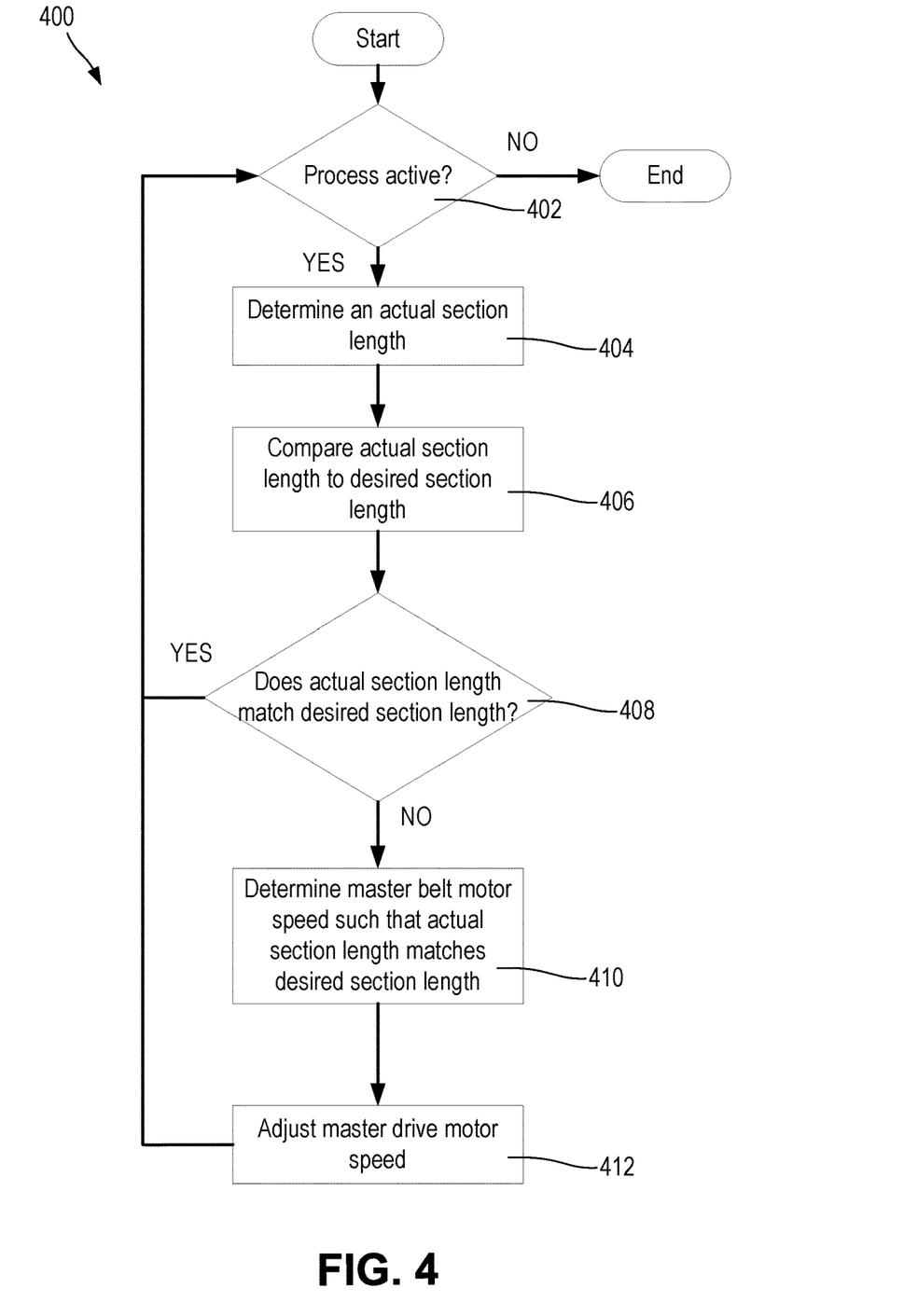
FIG. 4 is a flow chart of a method of controlling conveyors of a horizontal casting system with a control system according to embodiments of the disclosure.

FIG. 4 illustrates a non-limiting example of a process 400 of controlling a conveyor system, such as the conveyor system 106 or the conveyor system 206, with the control system 102 to provide a desired length of a cut section of the metal product.

In a block 402, the controller determines whether the conveyor system is being utilized during a casting process and/or otherwise as desired. In various aspects, the process ends when the conveyor system is no longer being utilized. In various examples, after block 402 and before block 404, the method may include controlling the mater master conveyor and the slave conveyor to provide a desired gap between adjacent sections of the metal product as described with reference to FIG. 3. In certain cases, the slave conveyor is synchronized with the master conveyor before block 404.

In a block 404, the controller determines an actual length of the cut section of the metal product. In some cases, prior to block 404, the method may include detecting, by the sensor, the downstream end of the cut section and the upstream end of the cut section. In various aspects, block 404 may include receiving, by the controller, the indication that the downstream end of the cut section is detected followed by an indication that the upstream end of the cut section is detected. Block 404 may also include determining the actual length of the cut section based on the data from the sensor. In some examples, block 404 may include determining the actual length of the cut section based on a duration of time between the detection of the downstream end of the cut section and the detection of the upstream end of the cut.

In a block 406, the controller compares the actual length of the cut section to a desired length of the cut section and, in a block 408, the controller determines whether the actual length of the cut section is within a predetermined tolerance of or is substantially the same as the desired length of the cut section. If the actual length is substantially the same as the desired length, the process may return to block 402.

In a block 410, if the actual length of the cut section is not substantially the same as the desired length of the cut section based on block 408, the controller may determine a control speed for the master motor of the master conveyor such that the actual length of the cut section is within a predetermined tolerance of the desired length of the cut section.

In a block 412, the controller controls the master motor to operate at the control speed and such that the actual length of the cut section is within a predetermined tolerance of the desired length of the cut section. In various cases, controlling the master motor to operate at the control speed causes the slave motor (and thus slave conveyor) to operate at the control speed because the slave conveyor was previously synchronized with the master conveyor. From block 412, the process returns to block 402.

A collection of exemplary embodiments are provided below, including at least some explicitly enumerated as "Illustrations" providing additional description of a variety of example embodiments in accordance with the concepts described herein. These illustrations are not meant to be mutually exclusive, exhaustive, or restrictive; and the disclosure not limited to these example illustrations but rather encompasses all possible modifications and variations within the scope of the issued claims and their equivalents.

Illustration 1. A metal casting system comprising: a master conveyor comprising a first conveying device and a first motor configured to drive the first conveying device; a slave conveyor comprising a second conveying device and a second motor configured to drive the second conveying device; a cutting device between the master conveyor and the slave conveyor, wherein the cutting device is configured to selectively cut a metal product that is conveyed by the master conveyor and the slave conveyor; and a control system comprising: a sensor downstream from the cutting device and configured to detect ends of sections of the metal product as the sections of the metal product move in a downstream direction; and a controller communicatively coupled with the sensor, wherein the controller is configured to control at least one of the first motor or the second motor based on the detected ends from the sensor.

Illustration 2. The metal casting system of any preceding or subsequent illustrations or combination of illustrations, wherein the metal casting system is a continuous casting system.

Illustration 3. The metal casting system of any preceding or subsequent illustrations or combination of illustrations, wherein the cutting device comprises a saw.

Illustration 4. The metal casting system of any preceding or subsequent illustrations or combination of illustrations, wherein the sensor is a non-contact sensor.

Illustration 5. The metal casting system of any preceding or subsequent illustrations or combination of illustrations, wherein the non-contact sensor comprises at least one of a laser sensor or an optical sensor.

Illustration 6. The metal casting system of any preceding or subsequent illustrations or combination of illustrations, wherein the sensor is configured to detect a downstream end and an upstream end of a cut section of the metal product that is discontinuous with an uncut section of the metal product immediately upstream from the cut section, and wherein the controller is configured to: synchronize the slave conveyor with the master conveyor; receive the upstream end and the downstream end from the sensor; determine an actual product length of the cut section of the metal product based on the detected upstream end and the detected downstream end; compare the actual product length to a predetermined product length of the cut section of the metal product; determine a speed of the first motor such that the actual product length is within a predetermined tolerance of the predetermined product length; and control the first motor to operate at the determined speed such that the actual product length is within a predetermined tolerance of the predetermined product length.

Illustration 7. The metal casting system of any preceding or subsequent illustrations or combination of illustrations, wherein the sensor is configured to detect a gap by detecting an upstream end of a cut section of the metal product and a downstream end of an uncut section of the metal product immediately upstream from the cut section and discontinuous with the cut section, wherein the cut section is spaced apart from the uncut section by the gap, and wherein the controller is configured to: receive the upstream end of the cut section and the downstream end of the uncut section from the sensor; determine an actual gap length of the gap based on the detected upstream end of the cut section and the detected downstream end of the uncut section; compare the actual gap length to a predetermined gap length; determine a speed of the second motor such that the actual gap length is within a predetermined tolerance of the predetermined gap length; and control the second motor to operate at the determined speed such that the actual gap length is within a predetermined tolerance of the predetermined gap length.

Illustration 8. The metal casting system of any preceding or subsequent illustrations or combination of illustrations, further comprising a casting mold upstream from the master conveyor and the slave conveyor.

Illustration 9. The metal casting system of any preceding or subsequent illustrations or combination of illustrations, wherein the first conveying device and the second conveying device each comprise at least one of an endless belt or a roller.

Illustration 10. A conveyor system for a metal casting system, the conveyor system comprising: a master conveyor comprising a first motor configured to drive a first endless belt; a slave conveyor comprising a second motor configured to drive a second endless belt; and a control system comprising: a sensor configured to detect ends of sections of a metal product being conveyed by at least one of the first endless belt or the second endless belt as the sections of the metal product move in a downstream direction; and a controller communicatively coupled with the sensor, wherein the controller is configured to control at least one of the first motor or the second motor based on the detected ends from the sensor.

Illustration 11. The conveyor system of any preceding or subsequent illustrations or combination of illustrations, wherein the sensor is configured to detect sequential ends of the metal product, and wherein the controller is configured to control the second motor based the sequential ends comprising an end of a cut section of the metal product and an end of an uncut section of the metal product immediately upstream from the cut section and discontinuous with the cut section.

Illustration 12. The conveyor system of any preceding or subsequent illustrations or combination of illustrations, wherein the sensor is configured to detect sequential ends of the metal product, and wherein the controller is configured to synchronize the slave conveyor with the master conveyor and control the first motor based the sequential ends comprising a downstream end of a cut section of the metal product and an upstream end of the cut section.

Illustration 13. The conveyor system of any preceding or subsequent illustrations or combination of illustrations, wherein the sensor comprises at least one of a laser sensor or an optical sensor.

Illustration 14. A method of controlling a conveying system, wherein the conveying system comprises a master conveyor and a slave conveyor separated from the master conveyor, the method comprising: detecting, with a sensor, sequential ends of a metal product being conveyed in a downstream direction by the conveying system; determining, by a controller, an actual length between the sequential ends based on the detected sequential ends; comparing, by the controller, the actual length to a predetermined length; determining, by the controller, a control speed of a motor of at least one of the master conveyor or the slave conveyor such that the actual length is within a predetermined tolerance of the predetermined length; and controlling, by the controller, the motor to operate at the control speed and such that the actual length is within a predetermined tolerance of the predetermined length.

Illustration 15. The method of any preceding or subsequent illustrations or combination of illustrations, wherein: the sequential ends comprise an end of a cut section of the metal product and an end of an uncut section of the metal product immediately upstream from the cut section and discontinuous with the cut section; determining the actual length comprises determining an actual gap length of a gap between the end of the cut section and the end of the uncut section; comparing the actual length to the predetermined length comprises comparing the actual gap length to a predetermined gap length; determining the control speed comprises determining the control speed of the motor of the slave conveyor such that the actual gap length is within a predetermined tolerance of the predetermined gap length;

and controlling the motor comprises controlling the motor of the slave conveyor to operate at the control speed and such that the actual gap length is within a predetermined tolerance of the predetermined gap length.

Illustration 16. The method of any preceding or subsequent illustrations or combination of illustrations, wherein: the sequential ends comprise a downstream end of a cut section of the metal product that is discontinuous with an uncut section of the metal product immediately upstream from the cut section and an upstream end of the cut section; determining the actual length comprises determining an actual product length of the cut section of the metal product; comparing the actual length to the predetermined length comprises comparing the actual product length to a predetermined product length; determining the control speed comprises determining the control speed of the motor of the master conveyor such that the actual product length is within a predetermined tolerance of the predetermined product length; and controlling the motor comprises controlling the motor of the master conveyor to operate at the control speed and such that the actual product length is within a predetermined tolerance of the predetermined product length.

Illustration 17. A method of controlling a conveying system, wherein the conveying system comprises a master conveyor and a slave conveyor separated from the master conveyor, the method comprising: detecting, with a sensor, a gap start end and a gap stop end of a gap between a first section of a metal product at least partially on the master conveyor and a second section of the metal product at least partially on the slave conveyor, wherein the second section is spaced apart from the first section by the gap; determining, by a controller, an actual gap length based on the gap start end and the gap stop end detected by the sensor; comparing, by the controller, the actual gap length to a predetermined gap length; determining, by the controller, a speed of a motor of the slave conveyor such that the actual gap length is within a predetermined tolerance of the predetermined gap length; and controlling, by the controller, the motor to the determined speed such that the actual gap length is within a predetermined tolerance of the predetermined gap length.

Illustration 18. The method of any preceding or subsequent illustrations or combination of illustrations, wherein a casting system comprises the conveying system and a saw between the master conveyor and the slave conveyor, and wherein detecting the gap start end and the gap stop end of the gap comprises detecting the gap start end and the gap stop end downstream from the saw.

Illustration 19. A method of controlling a conveying system, wherein the conveying system comprises a master conveyor and a slave conveyor separated from the master conveyor, the method comprising: detecting, with a sensor, a product start end and a product stop end of a cut section of a metal product while the cut section is conveyed by the conveying system; determining, by a controller, an actual product length based on the product start end and the product stop end detected by the sensor; comparing, by the controller, the actual product length to a predetermined product length; determining, by the controller, a speed of a motor of the master conveyor such that the actual product length is within a predetermined tolerance of the predetermined product length; and controlling, by the controller, the motor to the determined speed such that the actual product length is within a predetermined tolerance of the predetermined product length.

Illustration 20. The method of any preceding or subsequent illustrations or combination of illustrations, wherein a casting system comprises the conveying system and a saw between the master conveyor and the slave conveyor, and wherein detecting the product start end and the product stop end of the cut section of the metal product comprises detecting the product start end and the product stop end downstream from the saw.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A metal casting system comprising:
    a master conveyor comprising a first conveying device and a first motor configured to drive the first conveying device;
    a slave conveyor comprising a second conveying device and a second motor configured to drive the second conveying device;
    a cutting device between the master conveyor and the slave conveyor, wherein the cutting device is configured to selectively cut a metal product that is conveyed by the master conveyor and the slave conveyor; and
    a control system comprising:
        a sensor downstream from the cutting device and configured to detect ends of sections of the metal product in a direction of travel as the sections of the metal product move in a downstream direction; and
        a controller communicatively coupled with the sensor, wherein the controller is configured to control at least one of the first motor or the second motor based on detected ends in the direction of travel from the sensor, wherein the sensor is configured to detect a downstream end and an upstream end of a cut section of the metal product that is discontinuous with an uncut section of the metal product immediately upstream from the cut section, and wherein the controller is configured to:
            synchronize the slave conveyor with the master conveyor;
            receive the upstream end and the downstream end from the sensor;
            determine an actual product length of the cut section of the metal product based on the detected upstream end and the detected downstream end;
            compare the actual product length to a predetermined product length of the cut section of the metal product;
            determine a speed of the first motor such that the actual product length is within a predetermined tolerance of the predetermined product length; and
            control the first motor to operate at the determined speed such that the actual product length is within a predetermined tolerance of the predetermined product length.

2. The metal casting system of claim 1, wherein the metal casting system is a continuous casting system.

3. The metal casting system of claim 1, wherein the cutting device comprises a saw.

4. The metal casting system of claim 1, further comprising a casting mold upstream from the master conveyor and the slave conveyor.

5. The metal casting system of claim 1, wherein the first conveying device and the second conveying device each comprise at least one of an endless belt or a roller.

6. The metal casting system of claim 1, wherein the sensor is a non-contact sensor.

7. The metal casting system of claim 6, wherein the non-contact sensor comprises at least one of a laser sensor or an optical sensor.

8. A metal casting system comprising:
  a master conveyor comprising a first conveying device and a first motor configured to drive the first conveying device;
  a slave conveyor comprising a second conveying device and a second motor configured to drive the second conveying device;
  a cutting device between the master conveyor and the slave conveyor, wherein the cutting device is configured to selectively cut a metal product that is conveyed by the master conveyor and the slave conveyor; and
  a control system comprising:
    a sensor downstream from the cutting device and configured to detect ends of sections of the metal product in a direction of travel as the sections of the metal product move in a downstream direction; and
    a controller communicatively coupled with the sensor, wherein the controller is configured to control at least one of the first motor or the second motor based on detected ends in the direction of travel from the sensor, wherein the sensor is configured to detect a gap by detecting an upstream end of a cut section of the metal product and a downstream end of an uncut section of the metal product immediately upstream from the cut section and discontinuous with the cut section, wherein the cut section is spaced apart from the uncut section by the gap, and wherein the controller is configured to:
      receive the upstream end of the cut section and the downstream end of the uncut section from the sensor;
      determine an actual gap length of the gap based on the detected upstream end of the cut section and the detected downstream end of the uncut section;
      compare the actual gap length to a predetermined gap length;
      determine a speed of the second motor such that the actual gap length is within a predetermined tolerance of the predetermined gap length; and
      control the second motor to operate at the determined speed such that the actual gap length is within a predetermined tolerance of the predetermined gap length.

9. A method of controlling a conveying system of the casting system of claim 1, wherein the conveying system comprises the master conveyor and the slave conveyor separated from the master conveyor, the method comprising:
  detecting, with the sensor, sequential ends of a metal product being conveyed in the downstream direction by the conveying system;
  determining, by the controller, an actual length between the sequential ends based on the detected sequential ends;
  comparing, by the controller, the actual length to a predetermined length;
  determining, by the controller, a control speed of a motor of at least one of the master conveyor or the slave conveyor such that the actual length is within a predetermined tolerance of the predetermined length; and
  controlling, by the controller, the motor to operate at the control speed and such that the actual length is within a predetermined tolerance of the predetermined length.

10. The method of claim 9, wherein:
  the sequential ends comprise an end of a cut section of the metal product and an end of an uncut section of the metal product immediately upstream from the cut section and discontinuous with the cut section;
  determining the actual length comprises determining an actual gap length of a gap between the end of the cut section and the end of the uncut section; and
  comparing the actual length to the predetermined length comprises comparing the actual gap length to a predetermined gap length.

11. The method of claim 9, wherein:
  determining the control speed comprises determining the control speed of the motor of the slave conveyor such that the actual gap length matches the predetermined gap length; and
  controlling the motor comprises controlling the motor of the slave conveyor to operate at the control speed and such that the actual gap length is within a predetermined tolerance of the predetermined gap length.

12. The method of claim 9, wherein:
  the sequential ends comprise a downstream end of a cut section of the metal product that is discontinuous with an uncut section of the metal product immediately upstream from the cut section and an upstream end of the cut section;
  determining the actual length comprises determining an actual product length of the cut section of the metal product; and
  comparing the actual length to the predetermined length comprises comparing the actual product length to a predetermined product length.

13. The method of claim 12, wherein:
  determining the control speed comprises determining the control speed of the motor of the master conveyor such that the actual product length is within a predetermined tolerance of the predetermined product length; and
  controlling the motor comprises controlling the motor of the master conveyor to operate at the control speed and such that the actual product length is within a predetermined tolerance of the predetermined product length.

14. The method of claim 9, wherein detecting the sequential ends with the sensor comprises detecting the sequential ends with a non-contact sensor.

15. The method of claim 14, wherein detecting the sequential ends with the non-contact sensor comprises detecting the sequential ends with a laser sensor or an optical sensor.

* * * * *